United States Patent

Garg et al.

(10) Patent No.: US 10,435,548 B2
(45) Date of Patent: Oct. 8, 2019

(54) MULTIMODAL HIGH DENSITY POLYETHYLENE

(71) Applicant: SABIC GLOBAL TECHNOLOGIES B.V., Bergen op Zoom (NL)

(72) Inventors: Priya Garg, Vaals (NL); Nicolaas Hendrika Friederichs, Brunssum (NL); Tom Schoffelen, Hulsberg (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 50 days.

(21) Appl. No.: 15/576,331

(22) PCT Filed: Apr. 29, 2016

(86) PCT No.: PCT/EP2016/059617
§ 371 (c)(1),
(2) Date: Nov. 22, 2017

(87) PCT Pub. No.: WO2016/188703
PCT Pub. Date: Dec. 1, 2016

(65) Prior Publication Data
US 2018/0179366 A1 Jun. 28, 2018

(30) Foreign Application Priority Data

May 28, 2015 (EP) .................................... 15169599

(51) Int. Cl.
*C08L 23/06* (2006.01)
*F16L 9/12* (2006.01)
*C08L 23/08* (2006.01)

(52) U.S. Cl.
CPC ............ *C08L 23/06* (2013.01); *C08L 23/0815* (2013.01); *C08L 2203/18* (2013.01); *C08L 2205/02* (2013.01); *C08L 2205/025* (2013.01); *C08L 2207/062* (2013.01); *C08L 2314/02* (2013.01); *F16L 9/12* (2013.01)

(58) Field of Classification Search
CPC .............. C08L 23/06; C08L 23/0815; C08L 2203/025; C08L 2207/065; C08L 2314/02; C08F 210/16; C08F 210/14; C08F 2/001; C08F 4/6555; C08F 2/14; C08F 2500/07; C08F 2500/19; C08F 2500/05; C08F 110/02; C08F 2505/02; F16L 9/12
USPC ....................................................... 525/324
See application file for complete search history.

(56) References Cited

U.S. PATENT DOCUMENTS

| 4,178,300 A | 12/1979 | Van Den Berg |
| 6,225,420 B1 * | 5/2001 | Palmqvist ............... C08F 10/00 525/240 |
| 2001/0014724 A1 | 8/2001 | Promel et al. |
| 2014/0350200 A1 * | 11/2014 | Batinas-Geurts ..... C08F 210/16 526/124.3 |
| 2017/0166734 A1 * | 6/2017 | Garg ...................... C08F 210/16 |
| 2018/0208749 A1 * | 7/2018 | Garg ...................... C08F 210/16 |

FOREIGN PATENT DOCUMENTS

| EP | 0876318 B1 | 8/2000 |
| EP | 1146079 A1 | 10/2001 |
| EP | 1460105 A1 | 9/2004 |
| WO | 0022040 A1 | 4/2000 |
| WO | 2006018245 A1 | 2/2006 |
| WO | 2013087167 A2 | 6/2013 |
| WO | 2014001288 A1 | 1/2014 |

OTHER PUBLICATIONS

Alt et al., "Bimodal Polyethylene—Interplay of Catalyst and Process," Macromol. Symp. 2001, 163, 135-143.
International Search Report for International Application No. PCT/EP2016/059617; International Filing Date: Apr. 29, 2016; dated Aug. 26, 2016; 7 Pages.
Kurelec et al., Strain hardening modulus as a measure of environmental stress crack resistance of high density polyethylene, Polymer 46 (2005) p. 6369-6379.
PE 100 Pipe Systems, second edition, Heiner Bromstrup (editor), 2004, pp. 16-20 ISBN 3-8027-2728-2.
Written Opinion of the International Searching Authority for International Application No. PCT/EP2016/059617; International Filing Date: Apr. 29, 2016; dated Aug. 26, 2016; 7 Pages.

* cited by examiner

*Primary Examiner* — William K Cheung
(74) *Attorney, Agent, or Firm* — Cantor Colburn LLP

(57) ABSTRACT

The invention is directed to a multimodal polyethylene having a flow ratio FRR ranging between ≥25 and ≤35, a density ranging between ≥948.0 kg/m³ and ≤953.0 kg/m³, an $MFR_{190/5}$ ranging between ≥0.1 and ≤0.4 g/10 min and comprising from 50-54% by weight of an ethylene homopolymer A and from 46-50% by weight of an ethylene-hexene copolymer B, where ah percentages are based on the total weight of the composition and wherein ethylene homopolymer A has a viscosity number ≥110 cm³/g and ≤130 cm³/g and a density between ≥960.0 kg/m³ and ≤969.0 kg/m³. The polyethylene is suitable to be applied in the production of pipes.

13 Claims, No Drawings

MULTIMODAL HIGH DENSITY POLYETHYLENE

CROSS REFERENCE TO RELATED APPLICATIONS

This application is a 371 of International Application No. PCT/EP2016/059617, filed Apr. 29, 2016, which claims priority to European Application No. 15169599.6, filed May 28, 2015 which are incorporated herein by reference in their entirety.

The present invention relates to multimodal, preferably bimodal, high density polyethylene and a pressure pipe comprising the multimodal, preferably bimodal, polyethylene.

The production processes for bimodal high density polyethylene (HDPE) are summarised at pages 16-20 of "PE 100 Pipe systems" (edited by Brömstrup; second edition, ISBN 3-8027-2728-2).

The production of bimodal high density polyethylene (HDPE) via a low pressure slurry process is described by Alt et al. in "Bimodal polyethylene-Interplay of catalyst and process" (Macromol. Symp. 2001, 163, 135-143). In a two-stage cascade process the reactors may be fed continuously with a mixture of monomers, hydrogen, catalyst/cocatalyst and diluent recycled from the process. In the reactors, polymerisation of ethylene occurs as an exothermic reaction at pressures in the range between for example 0.2 MPa (2 bar) and 1 MPa (10 bar) and at temperatures in the range between for example 75° C. and 85° C. The heat from the polymerisation reaction is removed by means of external cooling. The characteristics of the polyethylene are determined amongst others by the catalyst system and by the concentrations of catalyst, co monomer and hydrogen.

The concept of the two-stage cascade process is elucidated at pages 137-138 by Alt et al. "Bimodal polyethylene-Interplay of catalyst and process" (Macromol. Symp. 2001, 163). The reactors are set up in cascade with different conditions in each reactor including for example a high hydrogen content in the first reactor and a low hydrogen content in the second reactor. This allows for the production of HDPE with a bimodal molecular mass distribution and desired co monomer content in the polyethylene chains. For reasons of monomer efficiency, it is common practise that the polymer suspension or "slurry" obtained after the second reactor flows into a so-called post reactor. In this reactor the final polymerisation takes place, resulting in a conversion rate of more than 99% of the monomers used. The suspension then flows to a suspension receiver and the suspension leaving the receiver is separated, for example via a decanter centrifuge. The resulting wet polymer is fed to a fluidised bed dryer and the liquid part goes back to the reactors. After drying the extrusion step takes place. The solvent coming from the drying of the polymer is recycled after purification by amongst other distillation.

For the reliable supply of modern infrastructure with natural gas or water, buried pipes play an important role to maintain high living standards. In the field of pressurized pipes, polymer pipes made of bimodal polyethylene have been used for many years. Initially, PE pipes were applied in the low-pressure regime up to 4 (gas) and 6 bar (water), respectively, today they are typically operated at pressure levels of up to 10 (gas) and 16 bar (water) and even higher. Pressurized PE pipes are designed to fulfill operating times of at least 50 years. The material classification of PE pipe grades is based on the long-term failure behavior using internal pipe pressure tests at different temperatures and extrapolation methods as described in EN ISO 9080 or ASTM D2837. Based on these tests, the minimum required strength (MRS) to ensure pipe lifetimes of at least 50 years is determined and leads to a classification of the materials as for example PE 80 (MRS=8 MPa) or PE 100 (MRS=10 MPa).

It is the object of the present invention to provide a HDPE grade having an improved hydrostatic strength while other properties such as for example slow crack growth resistance and impact resistance have values which are preferably higher than the values for PE 100 grade.

The multimodal polyethylene according to the invention has a flow ratio FRR ranging between $\geq 25$ and $\leq 35$, a density ranging between $\geq 948.0$ kg/m$^3$ and $\leq 953.0$ kg/m$^3$, an $MFR_{190/5}$ ranging between $\geq 0.1$ and $\leq 0.4$ g/10 min and comprising from 50-54% by weight of an ethylene homopolymer A and from 46-50% by weight of an ethylene-hexene copolymer B, where all percentages are based on the total weight of the composition and wherein ethylene homopolymer A has a viscosity number $\geq 110$ cm$^3$/g and $\leq 130$ cm$^3$/g and a density between $\geq 960.0$ kg/m$^3$ and $\leq 969.0$ kg/m$^3$.

According to a preferred embodiment of the invention the multimodal polyethylene is a bimodal polyethylene.

The density of polyethylene and copolymer A is determined according to ISO 1183.

The viscosity number of polyethylene and homopolymer A is determined according to ISO 1628-3.

The Flow Rate Ratio (FRR) is calculated as $MFR_{190/21.6}/MFR_{190/5}$. FRR is indicative for the rheological broadness of the material.

The melt-indices $MFR_{190/5}$ and $MFR_{190/21.6}$ are measured according to method ASTM D-1238 under a load of 5 and 21.6 kg respectively at 190° C.

A viscosity number $\geq 110$ cm$^3$/g and $\leq 130$ cm$^3$/g corresponds with $MFR_{190/2.16}$ in the range between 14 and 32 g/10 min.

According to a preferred embodiment of the invention the density of ethylene homopolymer A ranges between $\geq 966$ kg/m$^3$ and $\leq 969$ kg/m$^3$.

The amount of hexene incorporated in the ethylene-hexene copolymer B ranges between $\geq 1\%$ to $\leq 5\%$ by weight.

The density of the polyethylene ranging between $\geq 948.0$ kg/m$^3$ and $\leq 953.0$ kg/m$^3$ is based on base polymer without colourants such as carbon black.

According to a preferred embodiment of the invention the density of the multimodal polyethylene ranges between $\geq 948$ kg/m$^3$ and $\leq 952$ kg/m$^3$.

The polyethylene according to the invention has
impact resistance (according to Notched Charpy measurements at 23° C.; ISO 179)$\geq 55$ kJ/m$^2$ .
impact resistance (according to Notched Charpy measurements at −30° C.; ISO 179)$\geq 20$ kJ/m$^2$ .
strain hardening modulus (measured according to the strain hardening method, based on the publication by Kurelec, L. et al in *Polymer* 2005, 46, p 6369-6379)$\geq 60$ MPa and $\leq 75$ MPa.
creep strain at 5.4 MPa $\geq 4$ and $\leq 6.5\%$ (measurement as described in the examples) and
shear thinning index $\geq 24$ and $\leq 30$ (measurement as described in the examples).

Preferably the impact resistance (according to notched Charpy measurements at 23° C.; ISO 179) $\geq 80$ kJ/m$^2$. Preferably the impact resistance (notched Charpy measurements at −30° C.; ISO 179) $\leq 40$ kJ/m$^2$.

It is the advantage of the present invention that the ethylene polymer has a higher hydrostatic strength than a PE 100 grade and furthermore improved mechanical properties such as for example impact resistance and strain hardening.

Furthermore, the polymer according to the invention has a good low sagging performance and good processability.

It is surprising that the multimodal, preferably bimodal, polyethylene having a Flow Rate Ratio ranging between ≥25 and ≤35 and being based on an ethylene homopolymer A having a density between ≥960.0 and ≤969.0 kg/m$^3$ results in a polyethylene having a higher hydrostatic strength than a PE100 grade.

According to a preferred embodiment of the invention the high density polyethylene is produced with a multi-step slurry polymerisation process using cascaded reactors in the presence of a Ziegler Natta catalyst system.

According to a further preferred embodiment of the invention the high density ethylene copolymer is produced with a multi-step slurry polymerisation process of ethylene using cascaded reactors in the presence of a catalyst system comprising (I) the solid reaction product obtained by reaction of:
  a) a hydrocarbon solution containing
    1) an organic oxygen containing magnesium compound or a halogen containing magnesium compound and
    2) an organic oxygen containing titanium compound and
  b) an aluminium halogenide having the formula AlR$_n$ X$_{3-n}$ which R is a hydrocarbon moiety containing 1-10 carbon atoms, X is halogen and 0<n<3 and
(II) an aluminium compound having the formula AlR$_3$ in which R is a hydrocarbon moiety containing 1-10 carbon atoms.

During the reaction of the hydrocarbon solution comprising the organic oxygen containing magnesium compound and the organic oxygen containing titanium compound with component (I b) a solid catalyst precursor precipitates and after the precipitation reaction the resulting mixture is heated to finish the reaction.

The aluminium compound (II) is dosed prior to or during the polymerization and may be referred to as a cocatalyst.

The multi-step slurry polymerisation process may be a two or a three-step slurry polymerisation process. According to a preferred embodiment of the invention the multi-step slurry polymerisation is a two-step slurry polymerisation process.

Preferably, the diluent in the slurry polymerisation process is a diluent consisting of aliphatic hydrocarbon compounds that displays an atmospheric boiling temperature of at least 35° C., more preferred above 55° C. Suitable diluents is hexane and heptane. The preferred diluent is hexane.

Suitable organic oxygen containing magnesium compounds include for example magnesium alkoxides such as magnesium methylate, magnesium ethylate and magnesium isopropylate and alkylalkoxides such as magnesium ethylethylate and so called carbonized magnesiumalkoxide such as magnesium ethyl carbonate.

Preferably, the organic oxygen containing magnesium compound is a magnesium alkoxide. Preferably the magnesium alkoxide is magnesium ethoxide Mg(OC$_2$H$_5$)$_2$.

Suitable halogen containing magnesium compounds include for example magnesium dihalides and magnesium dihalide complexes wherein the halide is preferably chlorine.

Preferably the hydrocarbon solution comprises an organic oxygen containing magnesium compound as (I) (a) (1).

Suitable organic oxygen containing titanium compound may be represented by the general formula [TiO$_x$ (OR)$_{4-2x}$]$_n$ in which R represents an organic moiety, x ranges between 0 and 1 and n ranges between 1 and 6.

Suitable examples of organic oxygen containing titanium compounds include alkoxides, phenoxides, oxyalkoxides, condensed alkoxides, carboxylates and enolates. Preferably the organic oxygen containing titanium compounds is a titanium alkoxide. Suitable alkoxides include for example Ti (OC$_2$H$_5$)$_4$, Ti (OC$_3$H$_7$)$_4$, TiOC$_4$H$_9$)$_4$ and Ti (OC$_8$H$_{17}$)$_4$. Preferably the organic oxygen containing titanium compound is Ti (O$_4$H$_9$)$_4$.

Preferably the aluminium halogenide is a compound having the formula AlR$_n$ X$_{3-n}$ in which R is a hydrocarbon moiety containing 1-10 carbon atoms, X is halogen and 0.5<n<2. Suitable examples of the aluminium halogenide in (I) b having the formula AlR$_n$X$_{3-n}$ include ethyl aluminium dibromide, ethyl aluminium dichloride, propyl aluminium dichloride, n-butyl aluminium dichloride, iso butyl aluminium dichloride, diethyl aluminium chloride, diisobutyl aluminium chloride. Preferably X is Cl. Preferably the organo aluminium halogenide in (I) b) is an organo aluminium chloride, more preferably the organo aluminium halogenide in (I) b) is chosen from ethyl aluminium dichloride, diethyl aluminium dichloride, isobutyl aluminium dichloride, diisobutyl aluminium chloride or mixtures thereof.

Generally the molar ratio of Al from I b): Ti from I a) 2 ranges between 3:1 and 16:1. According to a preferred embodiment of the invention the molar ratio of Al from I b): Ti from I a) 2 ranges between 6:1 and 10:1.

Suitable examples of the cocatalyst of the formula AlR$_3$ include tri ethyl aluminium, tri isobutyl aluminium, tri-n-hexyl aluminium and tri octyl aluminium. Preferably the aluminium compound in (II) of the formula AlR$_3$ is tri ethyl aluminium or tri isobutyl aluminium.

The hydrocarbon solution of organic oxygen containing magnesium compound and organic oxygen containing titanium compound can be prepared according to procedures as disclosed for example in U.S. Pat. No. 4,178,300 and EP0876318. The solutions are in general clear liquids. In case there are any solid particles, these can be removed via filtration prior to the use of the solution in the catalyst synthesis.

Generally the molar ratio of magnesium: titanium is lower than 3:1 and preferably the molar ratio magnesium: titanium ranges between 0, 2:1 and 3:1.

Generally the molar ratio of aluminium from (II): titanium from (a) ranges between 1:1 and 300:1 and preferably the molar ratio of aluminium from (II): titanium from (a) ranges between 3:1 and 100:1.

The catalyst may be obtained by a first reaction between a magnesium alkoxide and a titanium alkoxide, followed by dilution with a hydrocarbon solvent, resulting in a soluble complex consisting of a magnesium alkoxide and a titanium alkoxide and thereafter a reaction between a hydrocarbon solution of said complex and the organo aluminium halogenide having the formula AlR$_n$X$_{3-n}$ Optionally an electron donor can be added either during the preparation of the solid catalytic complex (at the same time as the subsequent step or in an additional step) or at the polymerization stage. The addition of an electron donor is for example disclosed in WO2013087167.

Generally, the aluminium halogenide having the formula AlR$_n$X$_{3-n}$ is used as a solution in a hydrocarbon. Any hydrocarbon that does not react with the organo aluminium halogenide is suitable to be applied as the hydrocarbon.

The sequence of the addition can be either adding the hydrocarbon solution containing the organic oxygen containing magnesium compound and organic oxygen containing titanium compound to the compound having the formula $AlR_nX_{3-n}$ or the reversed.

The temperature for this reaction can be any temperature below the boiling point of the used hydrocarbon. Generally the duration of the addition is preferably shorter than 1 hour.

In the reaction of the hydrocarbon solution of the organic oxygen containing magnesium compound and the organic oxygen containing titanium compound with the organo aluminium halogenide of formula $AlR_nX_{3-n}$, the solid catalyst precursor precipitates. After the precipitation reaction the resulting mixture is heated for a certain period of time to finish the reaction. After the reaction the precipitate is filtered and washed with a hydrocarbon. Other means of separation of the solids from the diluents and subsequent washings can also be applied, like for example multiple decantation steps. All steps should be performed in an inert atmosphere of nitrogen or another suitable inert gas.

The polymerization can be carried out in the presence of an anti-static agent or anti fouling agent in an amount ranging between for example 1 and 500 ppm related to the total amount of reactor contents.

The polyethylene is suitable to be applied in the production of pipes, pipe fittings, films and blow molding applications and injection molding.

Preferably the polymer according to the invention is applied in the production of pipes for transport of drinking water.

EP1460105 discloses a bimodal polyethylene having a density greater than or equal to 953.0 kg/m³ and SHI of 70 or more to reach a higher hydrostatic strength material such as PE125.

EP1146079 discloses a polyethylene resin having a FRR greater than 38 and overall density greater than 953 kg/m³ to achieve a higher hydrostatic strength material.

US 2001/0014724 discloses that the homopolymer (A) preferably exhibits an $MFR_{190/2.16}$ of at least 50, very particularly of at least 90. Also, the homopolymer has a standard density of at least 970 is very particularly preferred. In example 4 (table 3), the $MFR_{190/2.16}$ of 116 correlates with a viscosity number of 85 cm³/g and a density of 85 cm³/g.

US 2001/0014724 discloses a multimodal polyethylene having a flow ratio FRR 28.7, a density of 949.0 kg/m³, an $MFR_{190/5}$ of 0.23 g/10 min and comprising from 55% by weight of an ethylene homopolymer A and from 45% by weight of an ethylene-hexene copolymer B, where all percentages are based on the total weight of the composition and wherein ethylene homopolymer A has a viscosity number 85 cm³/g and a density 971 kg/m³.

The invention will be elucidated by means of the following non-restrictive examples.

EXAMPLES

The solids content in the catalyst suspension was determined in triplo by drying 5 ml of a catalyst suspension under a stream of nitrogen, followed by evacuating for 1 hour and subsequently weighing the obtained amount of dry catalyst.

The density of the polymers is measured according to ISO1183.

The viscosity number is determined according to ISO 1628-3.

The melt-indices $MFR_{190/2.16}$, $MFR_{190/5}$ and $MFR_{190/21.6}$ are measured according to method ASTM D-1238 under a load of 2.16, 5 and 21.6 kg at 190° C.

The Flow Rate Ratio (FRR) being calculated as $MFR_{190/21.6}/MFR_{190/5}$ is indicative for the rheological broadness of the material.

The split of the bimodal polymer is defined as the weight fraction of the lower molecular weight material in the overall polymer. For the semi-batch process as described in the following polymerization examples, this translates into the cumulative ethylene consumption from the first polymerization step compared to the cumulative ethylene consumption in the combined first and second step.

The elemental compositions of the catalysts were analysed using Neutron Activation Analysis.

The alkoxide content in the final catalyst was determined by GC analysis of a water-quenched catalyst sample.

The tensile tests were performed according to ISO 527-2 1BA.

The impact resistance was measured according to Notched Charpy measurement at 23° C. and at −30° C. according to ISO 179.

The resistance to so called slow crack growth was measured using the strain hardening method, based on the publication by Kurelec, L. et al in *Polymer* 2005, 46, p 6369-6379.

The rheological parameters Shear Thinning Index SHI and DMS are determined by using a rheometer.

Shear thinning index SHI (2.7/210) is the ratio of the viscosity of the polyethylene composition at different shear stresses. In the present invention, the shear stresses at 2.7 kPa and 210 kPa are used for calculating the SHI (2.7/210) which is a measure of the broadness of the molecular weight distribution. The measurement conditions for SHI are described in detail on page 8 line 29 to page 11, line 25 of WO 00/22040.

DMS parameters indicate the frequency (107) at which a pre-defined/reference complex modulus value is reached for a polymer in a frequency sweep experiment.

The DMS parameters are suffixed with a number (e.g. DMSn) where 'n' denotes the reference G* value in the format $n*10^4$ Pa. Different DMS values as typically calculated at different reference G* are:
DMS2 indicates ω (rad/s) at $G^*=2*10^4$ Pa
DMS5 indicates ω (rad/s) at $G^*=5*10^4$ Pa
DMS10 indicates ω (rad/s) at $G^*=10*10^4$ Pa
DMS21 indicates ω (rad/s) at $G^*=21*10^4$ Pa The calculation of DMS values takes into account the entire range of ω and G* data of a frequency sweep experiment (ω=100 rad/s to ω=0.01 rad/s). The plot of logω vs logG* is used for DMS calculation. A $3^{rd}$ order polynomial is used to fit the data such that the $R^2$ value of the fit is more than 0.99. The values of logω was calculated using the trend line equation at different reference G* values and consequently, values of DMS2, DMS5, DMS10 and DMS21 were evaluated. DMS 21/2 is a ratio of the DMS21 and DMS 2 values.

Creep strain tests have been used to rank materials for pressure resistance. The visco-elastic response of a material describes its ability to resist to load before permanent deformation occurs. Indeed, it is the excitation and availability of the mechanical relaxation times before yield in the polymer that will determine how resilient the material will be to long term creep loads. This property is assessed before permanent deformation sets in. Hence, applying a constant load or strain and recording the strain or stress will indicate the amount of relaxation that has occurred in the material and this provides a measure for IPT behavior i.e. the higher the creep strain rate, the lower the resistance to internal pressure. Measurements were performed as follows: The PE granules were compression moulded according to ISO 1872-2. ISO 527-2 type 1BA specimens were milled from the compression moulded sheet. Zwick 1455 tensile testing machine having a Zwick 1 kN load cell was used for performing the creep measurements at 80° C. The specimens are equilibrated at a temperature of 80° C. for 30 min prior measurement. A load is applied to the sample (5.4 MPa) for 60 minutes and the elongation measured. The elongation of the sample after set time (60 minutes) is used as a measure to rank the materials for their pressure resistance.

Experiment I

Preparation of a Hydrocarbon Solution Comprising the Organic Oxygen Containing Magnesium Compound and the Organic Oxygen Containing Titanium Compound 100 grams of granular $Mg(OC_2H_5)_2$ and 150 milliliters of $Ti(OC_4H_9)_4$ were brought in a 2 liter round bottomed flask equipped with a reflux condensor and stirrer. While gently stirring, the mixture was heated to 180° C. and subsequently stirred for 1.5 hours. During this, a clear liquid was obtained. The mixture was cooled down to 120° C. and subsequently diluted with 1480 ml of hexane. Upon addition of the hexane, the mixture cooled further down to 67° C. The mixture was kept at this temperature for 2 hours and subsequently cooled down to room temperature. The resulting clear solution was stored under nitrogen atmosphere and was used as obtained. Analyses on the solution showed a titanium concentration of 0.25 mol/l.

Experiment II

Preparation of the Catalyst

In a 0.8 liters glass reactor, equipped with baffles, reflux condenser and stirrer, 424 ml hexane and 160 ml of the complex from Example I were dosed. The stirrer was set at 1200 RPM. In a separate flask, 100 ml of 50% ethyl aluminum dichloride (EADC) solution was added to 55 mL of hexane. The resulting EADC solution was dosed into the reactor in 15 minutes using a peristaltic pump. Subsequently, the mixture was refluxed for 2 hours. After cooling down to ambient temperature, the obtained red/brown suspension was transferred to a glass P4 filter and the solids were separated. The solids were washed 3 times using 500 ml of hexane. The solids were taken up in 0.5 L of hexane and the resulting slurry was stored under nitrogen. The solid content was 64 g ml$^{-1}$ Catalyst analysis results:
Ti 10.8 wt %; Mg 11.2 wt %; Al 5.0 wt %; Cl 65 wt %; OEt 3.2 wt % and OBu 2.6 wt %.

Example I

The polymerization was carried out in a 20 liters autoclave using 10 liters purified hexane as a diluent. 8 mmols of tri-isobutylaluminum were added to the 10 liters purified hexane. In the first stage of the polymerization reaction the mixture was heated to 85° C. and pressurized with 1.2 bars ethylene and a hydrogen to ethylene ratio in the headspace of 1.7 v/v (volume/volume). Subsequently a slurry containing 45 mg of the catalyst obtained in Experiment I was dosed. The temperature was maintained at 85° C. and the pressure was kept constant by feeding ethylene. The amount of ethylene, needed to maintain constant pressure was monitored and is considered to be a direct measure for the amount of polymer produced. The hydrogen to ethylene ratio in the headspace was measured via online-GC and hydrogen was fed to maintain this ratio constant at 1.7 v/v. The first phase of the reaction was stopped after 180 minutes. Stopping was performed by de-pressurizing and cooling down the reactor contents. The second stage of the reactor is started by adding 1-hexene (165 ml) to the reactor subsequently raising the temperature to 80° C. and pressurizing the reactor with ethylene and hydrogen. The set partial pressure of ethylene in the second phase is 1.7 bar and the ratio for hydrogen to ethylene is 0.02 v/v. The reaction was stopped when a split of 51 had been reached. This split can be calculated directly by comparing the amount of ethylene uptake during the different stages of polymerisation. The polymerisation was stopped by de-pressurizing and cooling down the reactor. The reactor contents were passed through a filter; the polymer powder was collected and subsequently dried. The PE powder was stabilised by adding 2000 ppm of calcium stearate, 2000 ppm of Irganox 1010 and 1000 ppm of Irgafos 168. The stabilised powder was extruded into pellets using a lab scale co-rotating twin screw extruder having L/D of 25.5, throughput of 50 g/min and rpm of 100. The pellets were used for the mentioned analyses.

The polymer had the following characteristics
viscosity number first reactor product 120 cm$^3$/g
density first reactor product 968 kg/m$^3$
overall density 949.5 kg/m$^3$
overall MFR$_{190/5}$ 0.15 g/10 min overall MFR$_{190/21.6}$ 4.32 g/10 min and
FRR$_{21.6/5)}$ 29

Example II

The polymerization was carried out similarly to the procedure as described in Comparative example A with the exceptions that the hydrogen to ethylene ratio in the first polymerisation stage was maintained at 2.0. In the second stage, 1-hexene (250 ml) was used and the ratio of hydrogen to ethylene was maintained at 0.02. Split was 52.

The polymer had the following characteristics
viscosity number first reactor product 117 cm$^3$/g
density first reactor product 969 kg/m$^3$
overall density 948.7 kg/m$^3$
overall MFR$_{190/5}$ 0.22 g/10 min overall MFR$_{190/21.6}$ 5.95 g/10 min and
FRR$_{(21.6/5)}$28

Comparative Example A

As comparative resin a standard PE100 grade based on 1-hexene and comprising carbon black is applied (Borealis Borsafe HE3490 LS-H). The measured density of this grade is 961.1 kg/m$^3$.

In Table 1 the material properties of the products obtained with the products according to the Examples I and II and the product according to Comparative Example A are given.

TABLE 1

| | MFR$_{190/5}$ g/10 min | MFR$_{190/21.6}$ g/10 min | FRR | Density kg/m$^3$ |
|---|---|---|---|---|
| Comp. Example A | 0.23 | 8.82 | 38 | 961.1 |
| Example I | 0.15 | 4.32 | 29 | 949.5 |
| Example II | 0.22 | 5.95 | 28 | 948.7 |

TABLE 1-continued

| | Notched Charpy 23° C. (kJ/m$^2$) | Notched Charpy - 30° C. (kJ/m$^2$) | Strain hardening modulus (MPa) | Creep strain at 5.4 MPa (%) |
|---|---|---|---|---|
| Comp. Example A | 28.94 | 9.02 | 66.03 | 10.68 |
| Example I | 64.86 | 31.23 | 69.6 | 4.81 |
| Example II | 57.02 | 24.74 | 71.62 | 6.14 |

| | DMS2 | DMS5 | DMS10 | DMS21 | DMS 21/2 | SHI |
|---|---|---|---|---|---|---|
| Comp. Example A | 0.23 | 1.36 | 7.31 | 68.94 | 296.43 | 84.87 |
| Example I | 0.11 | 0.66 | 3.09 | 23.1 | 210.0 | 26.38 |
| Example II | 0.15 | 0.98 | 4.67 | 35.81 | 238.73 | 27.23 |

The table shows that the invention significantly improves mechanical properties (such as impact and strain hardening modulus) and results in a higher pressure resistance due to lower creep strain for a rheological narrower material.

The invention claimed is:

1. A multimodal polyethylene having a flow ratio FRR ranging between ≥25 and ≤35, a density ranging between ≥948.0 kg/m$^3$ and ≤953.0 kg/m$^3$, an MFR $_{190/5}$ ranging between ≥0.1 and ≤0.4 g/10 min and comprising from 50-54% by weight of an ethylene homopolymer A and from 46-50% by weight of an ethylene-hexene copolymer B, where all percentages are based on the total weight of the composition and wherein ethylene homopolymer A has a viscosity number ≥110 cm$^3$/g and ≤130 cm$^3$/g and a density between ≥960.0 kg/m$^3$ and ≤969.0 kg/m$^3$.

2. The multimodal polyethylene according to claim 1 characterized in that the multimodal polyethylene is a bimodal polyethylene.

3. Polyethylene according to claim 1 characterized in that the density of ethylene homopolymer A ranges between ≥966 kg/m$^3$ and ≤969 kg/m$^3$.

4. Polyethylene according to claim 1 characterized in that the density of the multimodal polyethylene ranges between ≥948 kg/m$^3$ and ≤952 kg/m$^3$.

5. Polyethylene according to claim 1 characterized in that the amount of hexene incorporated in the ethylene-hexene copolymer B ranges between ≥1% to ≤5% by weight.

6. A process for the preparation of polyethylene according to claim 1 with a multi-step slurry polymerisation process of ethylene using cascaded reactors in the presence of a catalyst system comprising
 (I) the solid reaction product obtained from the reaction of:
  a) a hydrocarbon solution containing
   1) an organic oxygen containing magnesium compound or a halogen containing magnesium compound and
   2) an organic oxygen containing titanium compound and
  b) an aluminium halogenide having the formula AlR$_n$X$_{3-n}$ in which R is a hydrocarbon moiety containing 1-10 carbon atoms , X is halogen and 0<n<3 and
 (II) an aluminium compound having the formula AlR$_3$ in which R is a hydrocarbon moiety containing 1-10 carbon atom.

7. A process according to claim 6 characterised in that the multistep slurry polymerisation process is a two-step slurry polymerisation process.

8. Article comprising polyethylene according to claim 1.

9. Pipe comprising polyethylene according to claim 1.

10. Article comprising polyethylene obtained with the process according to claim 6.

11. Polyethylene according to claim 1 characterized in that the polyethylene has a notched Charpy impact resistance of ≥55 kJ/m$^2$ and ≤80 kJ/m$^2$ as measured at 23° C. in accordance with ISO 179.

12. Polyethylene according to claim 1 characterized in that the polyethylene has a shear thinning index of ≥24 and ≤30.

13. Polyethylene according to claim 1 characterized in that the polyethylene has a strain hardening modulus of ≥60 MPa and ≤75 MPa.

* * * * *